G. VAN CAMP.
TIRE VALVE DEVICE.
APPLICATION FILED JULY 17, 1920.
1,375,429.
Patented Apr. 19, 1921.
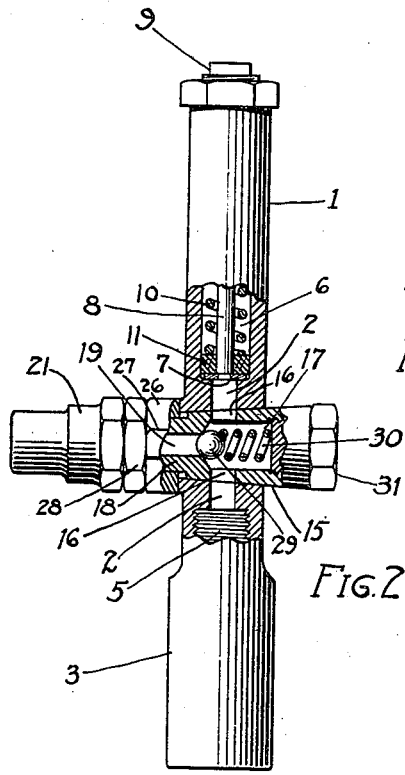
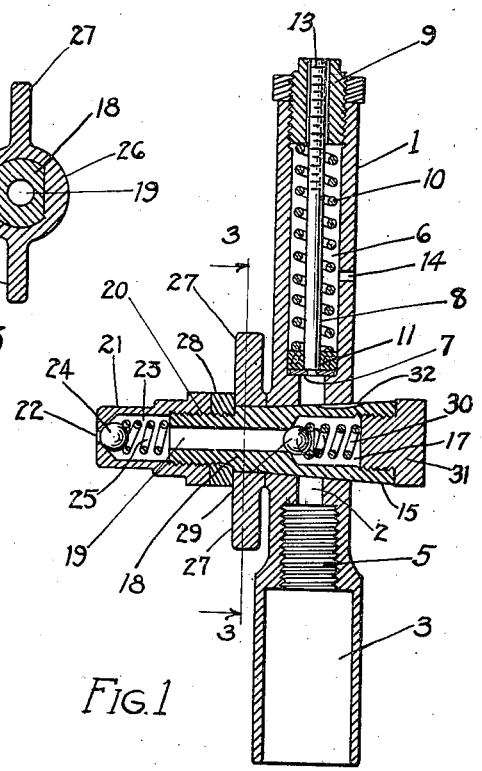
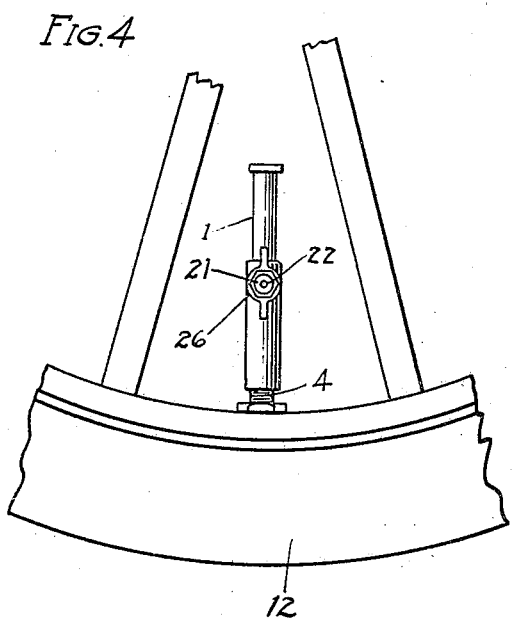
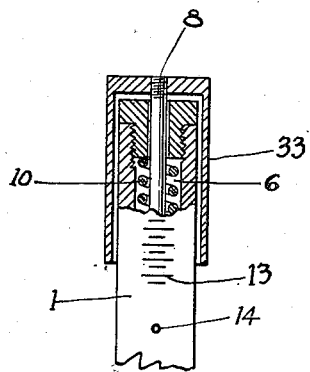
INVENTOR
GORDON VAN CAMP
By Paul & Paul
HIS ATTORNEYS

UNITED STATES PATENT OFFICE.

GORDON VAN CAMP, OF DRAYTON, NORTH DAKOTA.

TIRE-VALVE DEVICE.

1,375,429.     Specification of Letters Patent.     Patented Apr. 19, 1921.

Application filed July 17, 1920. Serial No. 397,045.

*To all whom it may concern:*

Be it known that I, GORDON VAN CAMP, a citizen of the United States, and resident of Drayton, in the county of Pembina and State of North Dakota, have invented certain new and useful Improvements in Tire-Valve Devices, of which the following is a specification.

This invention relates to a new and useful tire valve device which is adapted to be affixed to and carried by the usual vehicle pneumatic tire stem.

An object of this invention is to provide a tire valve device by means of which the pressure in the tire may be easily determined at any time.

Another object is to prevent the inflation of the tire beyond a predetermined amount.

Other objects of the invention will more fully appear from the following description, and the accompanying drawings and will be pointed out in the annexed claims. In the drawings, there has been disclosed a structure designed to carry out the objects of the invention, but it is to be understood that the invention is not to be confined to the exact features shown, as various changes may be made within the scope of the claims which follow.

Figure 1 is a longitudinal sectional view of the device with the rotatable valve shown in closed position, Fig. 2 is a partial sectional view similar to Fig. 1 and showing the valve in open position, Fig. 3 is a section on the line 3—3 of Fig. 1, Fig. 4 is a view showing the device in position on a vehicle tire, Fig. 5 is a modification showing the employment of a cap on the pressure gage.

This novel device differs from the present devices which provide a pressure gage in connection with means for inflating a pneumatic tire in that by the employment of this device the usual check valve in the tire stem is removed and direct unimpeded communication is provided between the tire interior and this device. It broadly includes a casing adapted to be affixed to a valveless pneumatic tire stem, a pressure gage, and a manually operable valve to open and close communication with the tire. When opened, the air pressure in the tire may directly react upon the pressure gage and pressure indication read. Further, an escape for excess pressure during inflation is provided, but this escape is prevented under working conditions to guard against successive pressure increases in a tire, due to impacts of the tire with objects on the roadway, such as rocks, etc.

This selected embodiment of the device includes a cylindrical casing 1 having an air passage 2, longitudinally extending therethrough. The lower portion of the casing 1 is shaped to provide an interiorly enlarged portion 3 which is adapted to extend downwardly over the usual vehicle tire valve stem 4. Above this enlarged portion 3, the casing provides an interiorly threaded recess 5, which is adapted to be received in threaded engagement on the threaded nipple portion of the common form of tire valve stem 4.

The stem as employed in this application is understood to include any tubular connection with the tire interior by means of which the pneumatic tire is inflated. While the usual stem is here shown it is to be understood that other forms may be employed.

When in position this device is adapted to be inserted over the usual tire valve 4 so that the threaded recess 5 is securely affixed to the threaded nipple portion of the tire valve stem, while the cylindrical side of the enlarged portion 3 extends down over the tire valve and protects the same from injury under working conditions.

The present commercial form of tire valve stem 4 is provided with an inwardly opening check valve which carries a pin upwardly projecting to a point adjacent the exterior of the valve stem. In applying this novel device to a tire valve stem, such common form of check valve is removed so that this novel device has the added function of preventing escape of air under pressure from the tire.

A pressure gage is provided in the upper portion of the casing 1. To this end the air passage 2 in the upper portion of the casing is enlarged to form a piston chamber 6 in which is slidably mounted a piston 7 having secured thereto a rod 8 which is slidably borne by the block 9 and received in threaded engagement in the upper end of the casing 1.

Tension means, such as a spring 10, functions to hold the piston in lower position against any air pressure in the passage 2. This spring 10 is coiled about the rod 8 and its ends are held between the packing 11, carried by the rod adjacent the piston 7, and the block 9. The tension of the spring may be adjustably altered by means of adjustment of the block 9. When communication is afforded between the tire 12 and the piston 7 the piston is upwardly forced in accordance with the amount of pressure in the tire. In order to afford a reading of the amount of pressure in the tire, a series of suitable pressure indications 13 are provided on the piston rod 8, which rod is adapted slidably to project from the block 9 and thus to permit reading of the particular pressure indication for a given inflation of the tire.

In order that over-inflation may be guarded against, the casing 1 is provided at a predetermined point with an aperture 14 so that, when the piston 7 is raised by the pressure in the communicating air passage 2 above a predetermined amount, the piston 7 will be above the aperture 14 and any attempted increase of air pressure results in escape of the air to the atmosphere through the aperture 14.

A novel valve is operably carried by the casing and extends transversely through the air passage. This valve consists of an elongated member 15 having a port 16 extending through the member and adapted, upon operation of the member, to open or close the passage 2. When in open position, the port 16 forms substantially a continuation of the air passage 2. An air chamber 17 is also preferably formed in this member. This chamber 17 communicates with the port 16 so that when the valve member 15 is manually turned to open position the port 16 is in alinement with the passage 2, and affords a communication through the chambered valve member 15. The valve member is provided with an extended portion 18 and projects beyond the casing 1. This portion 18 is adapted to be connected to a source of air under pressure and is provided with a centrally longitudinal air-way 19 inwardly extending from the exterior of this portion 18 to the air chamber 17.

In this embodiment of the invention there is provision for connection of this extension to either a portable air pump of the common variety usually furnished with automobile or bicycle equipment, or to the usual hose connection to a pressure storage tank such as is ordinarily found at the various stores, garages, service stations, etc. For connection to the portable pump the extension is preferably provided with an externally threaded surface 20. In view, however, of the prevalence of the common frictionally engageable coupling of various commercial pressure installations, this invention includes a coupling 21 having its terminal portion interiorly threaded to be received in engagement with the threaded surface 20 of the portion 18. The coupling is also provided with a port 22 extending from the exterior of the coupling to an interior recess 23 within the coupling. The coupling 21 is adapted normally to be closed by an inwardly opening check valve such as a ball 24 normally retained upon its seat adjacent the port 22 by means of the spring 25. Such valve functions to exclude dirt and moisture from the device interior, prevents air leakage and obviates the necessity for a cap.

The portion 18 of the valve member projecting beyond the casing 1 is provided with angularly formed external sides as is shown in section in Fig. 3. A key 26 is positioned on the exterior of the portion 18 and is provided with wings 27 by means of which the valve member 15 may be rotated in the casing. Preferably the valve member 15 is longitudinally tapered so that it may be received in closely fitting engagement in the tapered opening formed transversely in the casing 1. The winged key 26 may be adjustably secured against the casing by means of the nut 28 received in threaded engagement on the threaded surface 20 of the extended portion 18 of the valve member.

When the valve member 15 is turned to its open position, as shown in Fig. 2, a reading on the pressure gage as to the amount of air in the tire may be immediately obtained as communication is afforded between the tire interior and the pressure gage.

It is obvious that provision must be made to prevent the escape of air from the air chamber outwardly through the air-way 19. This is the function of the inwardly opening check valve positioned in the air chamber 17, which consists of a ball 29 held against a suitably formed seat in the air chamber adjacent the way 19. This ball is held against its seat by means of the spring 30 which is backed against the cap 31 and received in threaded engagement within the end of the valve member 15.

The coupling 21 is preferably normally retained on the portion 18. When it is desired to inflate the tire, for example, by use of a portable hand pump, the coupling 21 is removed and the usual threaded pump connection is secured to the surface 20 of the extension 18 and the air is inwardly forced, unseating the ball 29 and causing the air to enter the tire and also to indicate the amount of pressure by means of its reaction upon the pressure gage. Outward escape of air is prevented by means of the check-ball 29. A similar operation results when the coupling 21 is employed in conjunction with the usual frictionally engageable hose from a source of compressed air. In the latter case, the air under pressure must unseat both the ball valves 24 and 29, outward escape being prevented by both valves. When the pressure in the tire, and, therefore, in the air pressure tube has reached a predetermined amount, the pressure gage piston will be raised upwardly past the aperture 14, permitting escape of the air through the aperture and resulting in an audible signal denoting the desired tire inflation. The valve member 15 is then manually rotated a quadrant into the position shown in Fig. 1 and the air under the desired pressure is confined in the tire.

In order that any air under pressure remaining in the pressure tube below the pressure gage 7 may escape, there is provided a groove 32 formed in the surface of the member 16. The function of this groove is to permit escape of any air confined under pressure below the piston 7, via the groove 32 to the atmosphere. This results in the lowering of the rod 8 to its normal position where its top is substantially flush with the top of the block 9.

In the modified form of pressure gage top shown in Fig. 5, there is provided a cap 33 apertured to receive in threaded engagement the rod 8. The cap is thus carried by and moved with the rod 8. In such modified form the pressure indications 13 are placed upon the outside of the casing 1. Pressures are denoted by the movement of the cap upwardly with relation to the casing 1.

The normal position of this device is that shown in Figs. 1 and 4 wherein the winged handle of the manually operating valve member is in substantially longitudinal alinement with the casing 1, so that a comparatively small amount of space is required for the mounting of this novel device upon the tire valve stem.

Having thus described my invention, what I claim as new, and desire to secure by Letters Patent is:

1. A tire valve device including a casing adapted to be affixed to a tire stem, an air passage in the casing and providing communication with the tire interior, a valve member carried by the casing and operable to open or close said communication, and an air chamber in said member communicable with the air passage when the member is in open position, means on said member adapted to be connected to a source of air under pressure, an air-way in said connecting means extending from the exterior to said air chamber, and an inwardly opening check valve in said air chamber to prevent outward escape of air through said air-way.

2. A tire valve device including a casing adapted to be affixed to a tire stem, a pressure gage carried by the casing, an air passage longitudinally extending in the casing and providing communication between the tire interior and said gage, a valve member carried by the casing and operable to open and close communication between said passage and tire interior, an extended portion on said valve member, an air-way in said portion having an opening to the atmosphere and having communication with the air passage when the member is in open position, means on said extended portion adjacent said opening to attach the portion to a source of air under pressure, and means to close said opening to the atmosphere.

3. A tire valve device including a casing adapted to be affixed to a tire stem, an air passage longitudinally extending in the casing and providing communication with the tire interior, a valve member carried by the casing and operable to open and close said communication, an extended portion on said valve member, an air-way in said member portion having an opening to the atmosphere and having communication with the air passage when the valve member is in open position, means on said extended portion adjacent said opening to secure the portion to a source of air under pressure, a complementary coupling element attachable to said securing portion, a chamber in said coupling element having an opening to the atmosphere and forming substantially an extension of said air way, and an inwardly opening check valve in said coupling chamber normally to close said opening to the atmosphere and operable to admit a supply of air under pressure to said air passage and tire upon opening of said valve member.

4. A tire valve device including a casing adapted to be affixed to a tire stem, an air passage in the casing and providing communication with the tire interior, an elongated tapered valve member borne by and transversely extending through said casing and operable to open and close said communication, means adjustable to move the member in its casing bearing whereby a close operable fit may be maintained and wear taken up, and means to connect the air passage with a source of air under pressure whereby admittance to said tire interior is afforded when the valve is in open position.

5. A tire valve device including a casing adapted to be affixed to a tire stem, an air passage in the casing having communication with the tire interior, said casing having an extended portion providing an air-way communicating with said air passage, terminal coupling means on said extended portion adapted to connect the air-way with a source of air under pressure, a terminal port on said coupling means and an inwardly opening check valve seated in said port to close the same thereby to exclude dirt and moisture and to permit entrance of air under pressure.

In witness whereof, I have hereunto set my hand this 3d day of July, 1920.

GORDON VAN CAMP.